Figure 1:
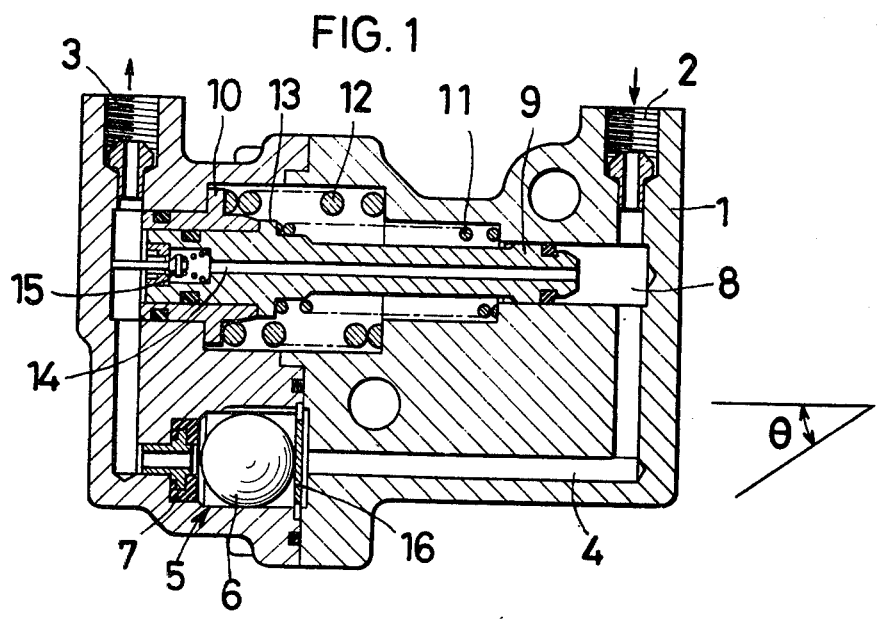

United States Patent [19]

Takata

[11] 4,260,196
[45] Apr. 7, 1981

[54] BRAKE PRESSURE CONTROL VALVE WITH DOUBLE SPLIT POINT

[75] Inventor: Koji Takata, Itami, Japan

[73] Assignee: Sumitomo Electric Industries, Ltd., Osaka, Japan

[21] Appl. No.: 94,304

[22] Filed: Nov. 13, 1979

[30] Foreign Application Priority Data

Nov. 23, 1978 [JP] Japan ................................ 53-144624

[51] Int. Cl.³ ............................................ B60T 13/00
[52] U.S. Cl. ................................. 303/6 C; 303/24 A; 303/24 C
[58] Field of Search ................... 303/6 C, 24 A, 24 C, 303/24 F, 22 R, 22 A; 188/349, 195

[56] References Cited

U.S. PATENT DOCUMENTS 3,768,869  10/1973  Bueler et al. ......................... 303/6 C
3,937,523  2/1976  Ayers, Jr. et al. .................... 303/6 C

FOREIGN PATENT DOCUMENTS 2003240  3/1979  United Kingdom .................. 303/24 F Primary Examiner—Douglas C. Butler
Attorney, Agent, or Firm—Wenderoth, Lind & Ponack

[57] ABSTRACT

A brake pressure control valve having a double split point. It has an inertia valve in one line and two pistons in another line parallel with the first one. One piston has a passage therethrough controlled by a valve.

2 Claims, 2 Drawing Figures

BRAKE PRESSURE CONTROL VALVE WITH DOUBLE SPLIT POINT

The present invention relates to a deceleration-sensitive, load-responsive brake pressure control valve which has a simple construction but allows good approximation to the ideal brake pressure distribution curve.

A brake pressure control valve of the deceleration-sensitive type is not responsive enough to a change in the loading condition of the vehicle to follow an ideal brake pressure distribution curve. Therefore, it must be sensitive not to a fixed deceleration but to a variable deceleration or be provided with an amplifying means for amplifying the split point (sometimes called the cut-in point or the refraction point) of the pressure reducing action according to the fluid pressure at the occurrence of the predetermined deceleration. Both types of control valves are known in the art.

The control valve according to the present invention belongs to the latter type. The conventional control valve of this type has a single split point or pressure reduction start point and is so adapted that the split point is displaced according to the loading condition of the vehicle.

It is an object of the present invention to provide a brake pressure control valve which has two split points.

It is another object of the present invention to provide a brake pressure control valve which allows better approximation to the ideal brake pressure distribution curve than the conventional control valve of this type having a single split point.

It is a further object of the present invention to provide a brake pressure control valve which assures the transmission of at least the minimum brake pressure to the rear brakes even in the event of accidental closure of the inertia valve (that is, a deceleration sensing valve) which can occur e.g. when the vehicle runs down a steep slope.

In accordance with the present invention, a control valve is provided which has two split points, the first one occurring when a predetermined level of deceleration is reached and the second one occurring some time after the first one. The output pressure corresponding to the second split point is an amplified value determined by the output pressure at the occurrence of the predetermined deceleration. The control valve of this invention is so adapted that the ratio of the second pressure reduction after the second split point is smaller than the ratio of the first pressure reduction after the first split point but is not zero.

In the event of failure in the front brake system, the braking fluid pressure required to obtain a predetermined deceleration increases so much that the split point becomes very high. Accordingly, the fluid pressure for the rear brake system is transmitted to the rear brakes without being reduced hardly at all. This is a feature common to deceleration-sensitive control valves.

Figure 2:
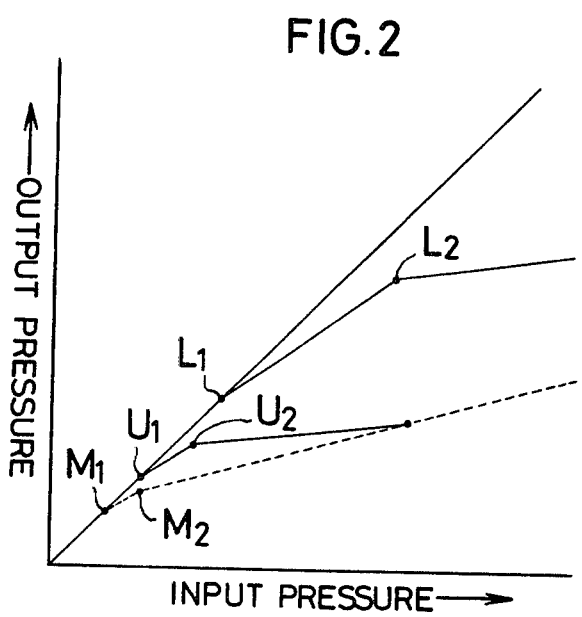

Other features and advantages of the present invention will become apparent from the following description taken with reference to the accompany drawings, in which:

FIG. 1 is a sectional view of the control valve according to this invention; and FIG. 2 is a performance curve of the control valve of FIG. 1 showing the relationship between the input pressure and the output pressure.

Referring to FIG. 1, the control valve according to this invention includes a body 1 which may consist of two sections for manufacturing purposes. The body has an inlet 2 and an outlet 3 for fluid for the rear brake system. In a line 4 placing the inlet 2 in communication with the outlet 3, an inertia valve 5 is provided which includes an inertia body or ball 6 and a valve seat 7. The entire body is mounted at an angle $\theta$ with respect to the horizontal axis of the vehicle.

In a line 8 parallel with the line 4, a first piston 9 and a second piston 10 are provided and urged leftwardly by a first spring 11 and a second spring 12, respectively. The second piston is slidably mounted on the first piston. The first piston 9 has a flange 13 near the lefthand end and engaged with the righthand end of the second piston 10. The first piston 9 has a center passage 14 extending axially therethrough. The passage is adapted to be controlled by a spring-loaded valve 15 which is open when the first piston 9 is in its extreme left position and closes when it moves rightwardly some distance. A shielding plate 16 is provided to prevent the fluid flow from acting directly on the inertia body 6.

The operation of the control valve according to this invention will be described below.

Let it be assumed that the cross-sectional area of the first piston 9 at its righthand portion where it slides along the inner wall of the line 8 is A1 and that of the first piston at its lefthand portion where it slides in the inner wall of the second piston 10 is A2 and that of the second piston 12 sliding along the enlarged inner wall of the line 8 is A3. A2 is larger than A1. (A1<A2).

Since A2 is larger than A1, the first piston 9 moves rightwardly against the force of the first spring 11 as the fluid pressure increases, so that the valve 15 closes to shut off the fluid flow through the passage 14 in the first piston. Under the fluid pressure applied to its left end (the effective crosssectional area: A3-A2), the second piston 10, too, moves rightwardly against the force of the second spring 12 with the increase in the fluid pressure. If the sectional areas A1, A2 and A3 and the spring constant and initial load of two springs are selected properly, the first piston 9 moves rightwardly to a larger extent than the second piston 10 does, so that the flange 13 of the first piston 9 moves away from the second piston 10.

When a level of deceleration determined by the mounting angle $\theta$ of the control valve is reached, the ball 6 rolls up the slope having the same gradient as the mounting angle, engaging the valve seat 7 to close the inertia valve 5. Since the center passage 14 in the first piston 9 has been closed by the valve 15, the communication between the inlet 2 and the outlet 3 is now shut off. This produces the first split point L1 or U1 in FIG. 2.

As the fluid pressure from the inlet 2 further increases, the first piston 9 is pushed back to the left. This increases the fluid pressure in the line leading from the outlet 3 to the rear brakes so that the second piston 10 continues to move rightwardly. When the flange 13 of the first piston 9 engages the second piston 10, the second split point L2 or U2 appears on FIG. 2.

Further increase of the fluid pressure from the inlet 2 causes the leftward movement of the second piston 10 together with the first piston 9. Therefore, the pressure reduction ratio after the second split point becomes smaller than that after the first split point.

In FIG. 2, the split points L1 and L2 are those for a loaded vehicle and the split points U1 and U2 are those for a no-load vehicle.

The output pressure at the first split point L1 or U1, which is the fluid pressure when the predetermined deceleration has occurred, is proportional to the total weight of the vehicle. In contrast, the output pressures at the second split points L2 and U2 depend on the cross-sectional areas A1, A2 and A3 of two pistons and the spring constant and initial load of two springs 11 and 12. In other words, the second split point is based on the first split point but is modified in-relation thereto by these structural parameters. The difference between L2 and U2 is the result of amplification of the difference between L1 and U1 to a desired level by suitably selecting the above-described parameters.

The ratios of these two pressure reductions and the level of the second split points are somewhat influenced by the rigidity of the rear brake line leading from the outlet 3 to the rear brakes, but calculation shows that this influence is practically negligible for a given model of vehicle.

The output pressure at U2 can be made equal to that at U1 by properly selecting the parameters, especially those for the springs.

The dotted line in FIG. 2 is a line showing the minimum braking output assured by the passage 14 in the first piston. Even if the inertia body 6 has already shut off the valve seat 7 before braking, such as when the vehicle runs down a steep slope, the communication between the inlet 2 and the outlet 3 is maintained through the passage 14 until the first piston 9 moves rightwardly a sufficient distance to close the valve 15. When the input pressure increases further, the valve 15 will open and close alternately to function as what is called a metering valve, thus assuring some extent of increase in the output pressure with a constant reduction ratio. Two reduction ratios can be obtained according to whether only the first piston 9 moves or both of the pistons 9 and 10 move. The dotted line in FIG. 2 after point M2 shows how the valve 15 operates as a metering valve for pressure reduction. The ratio of pressure reduction in this condition is slightly higher than the pressure reduction ratio in the normal operation (shown in FIG. 2 in a solid line).

Particularly under a no-load condition, the actual performance of the vehicle can sometimes transfer from the solid line to the dotted line during the pressure increase. The second split point M2 can be so set that it will be equal to the first split point M1. Further, if the second split point U2 for the no-load condition is set at a relatively low level, it is possible that the behavior or performance of the control valve will be on the dotted line over substantially the whole pressure range.

Although in the preferred embodiment the first piston 9 is provided with the passage 14 and the valve 15, substantially the same function can be achieved if the passage 14 and the valve 15 are omitted. However, such a control valve cannot cope with too early closing of the inertia valve which occurs e.g. when the vehicle runs down a steep slope. In other words, the performance as depicted by the dotted line in FIG. 2 cannot be achieved, but the performance as depicted by the solid lines remains unchanged except that under a no-load condition, the performance curve on which U1 and U2 lie would be straight after the second split point U2.

It will be understood from the foregoing that the control valve according to the present invention permits adjustment of the pressure reduction performance over a wide range by combination of the seven variables or parameters, that is, three cross-sectional areas A1, A2 and A3 of the pistons and the spring constants and the initial load of two springs (as well as the above-mentioned predetermined distance or stroke which the first piston has to move to the right to close the valve 15).

The relationship between these variables and the split points and the pressure reduction ratios will be shown below.

$$R_1 = \frac{A_1/A_2}{1 + (A_3/A_2)^2 \cdot K_1/K_2 + V_p \cdot K_1/A_2{}^2}$$

$$R_2 = \frac{A_1/A_3}{1 + V_p \cdot (K_1 + K_2)/A_3{}^2}$$

$$R_M = A_1/A_3$$

$$P_{2I} = P_1 + \frac{K_1/A_1[P_1\{(A_2 - A_1)/K_1 - (A_3 - A_2)/K_2\} - (F_1/K_1 - F_2/K_2)]}{1 - R_1 \cdot A_2/A_1 + R_1 \cdot (A_3 - A_2)/A_1 \cdot K_1/K_2}$$

$$P_{2O} = P_1 + \frac{K_1/A_1[P_1\{(A_2 - A_1)/K_1 - (A_3 - A_2)/K_2\} - (F_1/K_1 - F_2/K_2)]}{\frac{1}{R_1} - A_2/A_1 + (A_3 - A_2)/A_1 \cdot K_1/K_2}$$

$$P_{MI} = \frac{A_2\{F_1 + F_2 + S \cdot (K_1 + K_2)\} - A_3 \cdot (F_1 + S \cdot K_1)}{A_1 \cdot (A_3 - A_2)}$$

$$P_{MO} = (F_2 + S \cdot K_2)/(A_3 - A_2)$$

wherein:
- $A_1$: Cross-sectional area (cm$^2$) of first piston at its input side
- $A_2$: Cross-sectional area (cm$^2$) of first piston at its output side
- $A_3$: Cross-sectional area (cm$^2$) of second piston at its output side (The effective cross-sectional area of second piston is $A_3$ minus $A_2$.)
- $K_1$: Spring constant (kg/cm) of first spring
- $K_2$: Spring constant (kg/cm) of second spring
- $F_1$: Initial load (kg) of first spring
- $F_2$: Initial load (kg) of second spring
- $V_p$: Elasticity modulus (cm$^3$/kg/cm$^2$) of rear brake system
- $P_1$: Pressure at first split point (kg/cm$^2$) (Pressure when the deceleration sensitive valve operates.

Varies from $U_1$ to $L_1$ according to the loading condition of the vehicle.)

$P_{2I}$: Input pressure (kg/cm$^2$) at second split point

S: Stroke (cm) of the first piston required to close the valve 15

$P_{2O}$: Output pressure (kg/cm$^2$) at second split point $R_1$: Pressure reduction ratio between the first split point and the second split point $R_2$: Pressure reduction ratio after the second split point $P_{MI}$: Input pressure at split point $M_2$ on the minimum output assurance line (that is, the dotted line in FIG. 2)

$P_{MO}$: Output pressure at split point $M_2$ $P_M$: Pressure reduction ratio after split point $M_2$

What I claim is:

1. A deceleration-sensitive, load-responsive brake pressure control valve having a double split point comprising:

a body having an inlet, an outlet, and two lines placing the inlet in communication with the outlet and being parallel with each other, a deceleration sensing valve mounted in one of said two lines, a first piston mounted in the other line and acted upon by the input pressure and the output pressure and a first spring urging said first piston toward the outlet end of said other line, a second piston mounted on said first piston, acted upon by the output pressure and a second spring urging said second piston toward the outlet end of said other line, and means for limiting the stroke of said second piston to a valve not greater than the stroke of said first piston.

2. The brake pressure control valve as claimed in claim 1 wherein said first piston is provided with a passage axially extending therethrough for placing the inlet in communication with the outlet and a valve means associated with said passage and adapted to close to shut off the communication between the inlet and the outlet when the stroke of said first piston toward the inlet reaches a predetermined value.

* * * * *